US007076630B2

(12) United States Patent
Musoll et al.

(10) Patent No.: US 7,076,630 B2
(45) Date of Patent: Jul. 11, 2006

(54) METHOD AND APPARATUS FOR ALLOCATING AND DE-ALLOCATING CONSECUTIVE BLOCKS OF MEMORY IN BACKGROUND MEMO MANAGEMENT

(76) Inventors: Enrique Musoll, 7210 Via Romera, San Jose, CA (US) 95139; Mario Nemirovsky, 19750 Northhampton Dr., Saratoga, CA (US) 95070

( * ) Notice: Subject to any disclaimer, the term of this patent is extended or adjusted under 35 U.S.C. 154(b) by 87 days.

(21) Appl. No.: 09/881,934

(22) Filed: Jun. 14, 2001

(65) Prior Publication Data

US 2002/0016883 A1 Feb. 7, 2002

Related U.S. Application Data

(63) Continuation-in-part of application No. 09/737,375, filed on Dec. 14, 2000, and a continuation-in-part of application No. 09/602,279, filed on Apr. 3, 2001..
(60) Provisional application No. 60/181,364, filed on Feb. 8, 2000.

(51) Int. Cl.
*G06F 12/08* (2006.01)

(52) U.S. Cl. ........................... 711/172; 711/170
(58) Field of Classification Search ................. 711/170, 711/172
See application file for complete search history.

(56) References Cited

U.S. PATENT DOCUMENTS

| 4,200,927 A | 4/1980 | Hughes et al. |
| 4,707,784 A | 11/1987 | Ryan et al. |
| 4,942,518 A | 7/1990 | Weatherford et al. |
| 5,023,776 A | 6/1991 | Gregor |
| 5,121,383 A | 6/1992 | Golestani |
| 5,291,481 A | 3/1994 | Doshi et al. |
| 5,408,464 A | 4/1995 | Jurkevich |
| 5,465,331 A | 11/1995 | Yang et al. |
| 5,471,598 A | 11/1995 | Quattromani et al. |
| 5,521,916 A | 5/1996 | Choudhury et al. |
| 5,559,970 A | 9/1996 | Sharma |
| 5,619,497 A | 4/1997 | Gallagher et al. |
| 5,634,015 A | 5/1997 | Chang et al. |
| 5,659,797 A | 8/1997 | Zandveld et al. |

(Continued)

FOREIGN PATENT DOCUMENTS

WO      WO 03/005645 A2      1/2003

OTHER PUBLICATIONS

Diefendorff, Keith, K7 Challenges Intel, Microprocessor Report, Oct. 26, 1998, vol. 12, No. 14, US.

(Continued)

*Primary Examiner*—Kevin L. Ellis

(57) ABSTRACT

A system for allocating storage of incoming data packets into a memory of a packet processor has a first facility mapping a first block of memory of a fixed block size in bytes into an ordered plurality of atomic pages comprising each a fixed byte size, a second facility mapping the same block of memory into ordered virtual pages of different sizes, ranging from a smaller virtual page size equal to the atomic page size up to a larger virtual page size equal to the fixed block size, a third facility to allocate virtual pages as unavailable for storage or de-allocate virtual pages as available for storage, a fourth facility to receive a data packet, ascertain packet size for the received packet, and to determine fit by checking allocation state for virtual pages of a smallest size that is equal to or larger than the packet size, then allocation state for next larger virtual pages, and so on, until a de-allocated, available virtual page is found; and a fifth facility to select a virtual page to store the packet, and to update and mark associated atomic pages in the selected virtual page as available or unavailable for storage, in an ordered manner. The system is characterized in that, after each selection by the fifth facility, state of all atomic and virtual pages is updated.

23 Claims, 12 Drawing Sheets

U.S. PATENT DOCUMENTS

| | | | |
|---|---|---|---|
| 5,675,790 | A | 10/1997 | Walls |
| 5,708,814 | A | 1/1998 | Short et al. |
| 5,724,565 | A | 3/1998 | Dubey et al. |
| 5,737,525 | A | 4/1998 | Picazo et al. |
| 5,784,649 | A | 7/1998 | Begur et al. |
| 5,784,699 | A * | 7/1998 | McMahon et al. .......... 711/171 |
| 5,796,966 | A | 8/1998 | Simcoe et al. |
| 5,809,321 | A | 9/1998 | Hansen et al. |
| 5,812,810 | A | 9/1998 | Sager |
| 5,892,966 | A | 4/1999 | Petrick et al. |
| 5,918,050 | A | 6/1999 | Rosenthal et al. |
| 5,978,570 | A | 11/1999 | Hillis |
| 5,978,893 | A | 11/1999 | Bakshi et al. |
| 5,987,578 | A | 11/1999 | Butcher |
| 6,009,516 | A | 12/1999 | Steiss et al. |
| 6,016,308 | A | 1/2000 | Crayford et al. |
| 6,023,738 | A | 2/2000 | Priem et al. |
| 6,047,122 | A | 4/2000 | Spiller |
| 6,070,202 | A | 5/2000 | Minkoff et al. |
| 6,073,251 | A | 6/2000 | Jewett et al. |
| 6,088,745 | A | 7/2000 | Bertagna et al. |
| 6,131,163 | A | 10/2000 | Wiegel |
| 6,151,644 | A | 11/2000 | Wu |
| 6,157,955 | A | 12/2000 | Narad et al. |
| 6,169,745 | B1 | 1/2001 | Liu et al. |
| 6,219,339 | B1 | 4/2001 | Doshi et al. |
| 6,219,783 | B1 | 4/2001 | Zahir et al. |
| 6,223,274 | B1 | 4/2001 | Catthoor et al. |
| 6,226,680 | B1 | 5/2001 | Boucher et al. |
| 6,247,105 | B1 | 6/2001 | Goldstein et al. |
| 6,249,801 | B1 | 6/2001 | Zisapel et al. |
| 6,253,313 | B1 | 6/2001 | Morrison et al. |
| 6,263,452 | B1 | 7/2001 | Jewett et al. |
| 6,381,242 | B1 | 4/2002 | Maher, III et al. |
| 6,389,468 | B1 | 5/2002 | Muller et al. |
| 6,438,135 | B1 | 8/2002 | Tzeng |
| 6,453,360 | B1 | 9/2002 | Muller et al. |
| 6,460,105 | B1 | 10/2002 | Jones et al. |
| 6,483,804 | B1 | 11/2002 | Muller et al. |
| 6,502,213 | B1 | 12/2002 | Bowman-Amuah |
| 6,523,109 | B1 | 2/2003 | Meier |
| 6,529,515 | B1 | 3/2003 | Raz et al. |
| 6,535,905 | B1 | 3/2003 | Kalafatis et al. |
| 6,614,796 | B1 | 9/2003 | Black et al. |
| 6,625,808 | B1 | 9/2003 | Tarditi |
| 6,640,248 | B1 | 10/2003 | Jorgensen |
| 6,650,640 | B1 | 11/2003 | Muller et al. |
| 6,738,371 | B1 | 5/2004 | Ayres |
| 6,738,378 | B1 | 5/2004 | Tuck, III et al. |
| 6,813,268 | B1 | 11/2004 | Kalkunte et al. |
| 2001/0004755 | A1 | 6/2001 | Levy et al. |
| 2001/0005253 | A1 | 6/2001 | Kiroshi |
| 2001/0024456 | A1 | 9/2001 | Zeun et al. |
| 2001/0043610 | A1 | 11/2001 | Nemirovsky et al. |
| 2001/0052053 | A1 | 12/2001 | Nemirovsky et al. |
| 2002/0016883 | A1 | 2/2002 | Musoll et al. |
| 2002/0049964 | A1 | 4/2002 | Takeyama et al. |
| 2002/0054603 | A1 | 5/2002 | Mussoll et al. |
| 2002/0071393 | A1 | 6/2002 | Musoll |
| 2002/0083173 | A1 | 6/2002 | Musoll et al. |
| 2002/0124262 | A1 | 9/2002 | Basso et al. |
| 2004/0015598 | A1 | 1/2004 | Jin-Fun |
| 2004/0148382 | A1 | 7/2004 | Narad et al. |
| 2004/0172471 | A1 | 9/2004 | Porter |
| 2004/0172504 | A1 | 9/2004 | Balazich et al. |
| 2004/0213251 | A1 | 10/2004 | Tran et al. |
| 2005/0061401 | A1 | 3/2005 | Tokoro et al. |

OTHER PUBLICATIONS

Knuth, Donald E., "The Art of Computer Programming, vol. 1, Fundamental Algorithms", "Sec. 2.5 Dynamic Storage Allocation", 1997, pp. 435–456, Addison–Wesley, US.

U.S. Appl. No. 09/608,750, filed Jun. 30, 2000, Mario Nemirovsky et al.

Sampath et al., "Mechanism to Un-speculatively Pre-fetch Instructions from the Thread Associated to a Packet," Apr. 2, 2001.

Melvin et al., "Extended Instruction Set for a Packet Processing Applications," Jul. 5, 2001.

Yamamoto, Wayne, *An Analysis of Multistreamed, Superscalar Processor Architectures*, University of California Santa Barbara Dissertation. Dec. 1995. Santa Barbara, US.

Yamamoto et al. "Increasing Superscalar Performance Through Multistreaming." *Parellel Architectures and Compilation Techniques* (PACT '95). 1995.

The PowerPC Architecture: A Specification for a New Family of RISC Processors, $2^{nd}$ Ed. May 1994. pp. 70–72. Morgan Kaufmann, San Francisco, US.

*MC68020 32–Bit Microprocessor User's Manual*, $3^{rd}$ Ed.. 1989. pp. 3–125, 3–126, and 3–127. Prentice Hall, NJ, US.

Potel, M. J. "Real–Time Playback in Animation Systems," *Proceedings of the $4^{th}$ Annual Conference on Computer Graphics and Interactive Techniques*. 1977. pp. 72–77, San Jose, CA, US.

*ARM Architecture Reference Manual*. 1996. pp. 3–41, 3–42, 3–43, 3–67, and 3–68. Prentice Hall, NJ, US.

*ESA/390 Principles of Operation*. IBM Online Publications Center Reference No. SA22–7201–08. Table of Contents and paras, 7.5.31 and 7.5.70. IBM Corporation, Boulder, CO, US.

*MC88110 Second Generation RISC Microprocessor User's Manual*. 1991. pp. 10–66, 10–67, and 10–71. Motorola, Inc.

Diefendorff, Keith et al. "Organization of the Motorola 88110 Superscalar RISC Microprocessor," *IEEE Journal of Microelectronics*. Apr. 1992. pp. 40–63, vol. 12, No. 2, IEEE, New York, NY, US.

Kane, Gerry, *PA–RISC 2.0 Architecture*. 1996, pp. 7–106 and 7–107. Prentice Hall, NJ, US.

Diefendorff, Keith et al. "AltlVec Extension to PowerPC Accelerates Media Processing," *IEEE Journal of Microelectronics*, vol. 20, No. 2 (2000): pp. 85–95.

Grunewald, Winfried et al. "Towards Extremely Fast Context Switching in a Block Multithreaded Processor." *Proceedings of EUROMICRO 22*, 1996. pp. 592–599.

Bradford, Jeffrey et al. "Efficient Synchronization for Multithreaded Processors." *Workshop on Multithreaded Execution, Architecture, and Compilation*. Jan.–Feb. 1998. pp. 1–4.

Pai, Vijay et al. "An Evaluation of Memory Consistency Models for Shared–Memory Systems with ILP Processors," *Proceedings of ASPLOS–VII*, Oct. 1996: pp. 12–23, ACM, Inc.

Yoaz et al. "Speculation Techniques for Improving Load Related Instruction Scheduling." 1999. pp. 42–53, IEEE.

Kessler, R. E. "The Alpha 21264 Microprocessor: Out–of–Order Execution at 600 MHz," Aug. 1998.

Donaldson et al. "DISC: Dynamic Instruciton Stream Computer, An Evaluation of Performance," $26^{th}$ *Hawaii Conference on Systems Sciences*, vol. 1. 1993. pp. 448–456.

Nemirovsky et al. "DISC: Dynamic Instruction Stream Computer," ACM. 1991. pp. 163–171.

Musoll et al., "Mechanism to Activate a Context When No Stream is Running in a Multi–Streaming Processing Core," Apr. 16, 2001.

Musoll et al., "Mechanism for Allowing a Limited Packet Head and/or Tall Growth Without Moving the Packet to a Different Memory Location," Apr. 16, 2001.

Musoll, Enrique, "Functional Validation of a Packet Management Unit," May 18, 2001.

Musoll et al., "Mechanism to Overflow Packets to a Software Controlled Memory When They Do Not Fit into a Hardware Controlled Memory," Jul. 3, 2001.

U.S. Appl. No. 09/591510, filed Jun. 12, 2000, Gellnas et al.

Musoll et al., "Hardware Algorithm for Allocating and De–Allocating Consecutive Blocks of Memory," Apr. 3, 2001, Disclosure Document #491557, USPTO.

Musoll et al. Mechanism to Prevent the Download of a Packet with Pending Writes Affecting Its Data. Apr. 11, 2001. Disclosure Document #492430, USTPO.

Ungerer et al. A Survey of Processors with Explicit Multi-reading. ACM Computing Surveys, vol., 35, No. 1. Mar. 2003. pp. 29–63.

* cited by examiner

METHOD AND APPARATUS FOR ALLOCATING AND DE-ALLOCATING CONSECUTIVE BLOCKS OF MEMORY IN BACKGROUND MEMO MANAGEMENT

CROSS-REFERENCE TO RELATED DOCUMENTS

The conception of the invention was documented in Document Disclosure No. 491,557, entitled Hardware Algorithm for Allocating and De-allocationg Consecutive Blocks of Memory", filed on Apr. 3, 2001. The present invention is a continuation in part (CIP) to a U.S. patent application Ser. No. 09/602,279 entitled "Methods and Apparatus for Background Memory Management" filed on Jun. 23, 2000. The present invention is also a CIP to a U.S. patent application Ser. No. 09/737,375 entitled "Queuing System for Processors in Packet Routing Operations" and filed on Dec. 14, 2000, the latter claiming priority to a provisional patent application Ser. No. 60/181,364 filed on Feb. 08, 2000. The referenced applications are included herein by reference.

FIELD OF THE INVENTION

The present invention is in the area of integrated circuit microprocessors, and pertains in particular to memory management, and the use of microprocessor resources in such management.

BACKGROUND OF THE INVENTION

Microprocessors, as is well-known in the art, are integrated circuit (IC) devices that are enabled to execute code sequences which may be generalized as software. In the execution most microprocessors are capable of both logic and arithmetic operations, and typically modern microprocessors have on-chip resources (functional units) for such processing.

Microprocessors in their execution of software strings typically operate on data that is stored in memory. This data needs to be brought into the memory before the processing is done, and sometimes needs to be sent out to a device that needs it after its processing.

There are in the state-of-the-art two well-known mechanisms to bring data into the memory and send it out to a device when necessary. One mechanism is loading and storing the data through a sequence of Input/Output (I/O) instructions. The other is through a direct-memory access device (DMA).

In the case of a sequence of I/O instructions, the processor spends significant resources in explicitly moving data in and out of the memory. In the case of a DMA system, the processor programs an external hardware circuitry to perform the data transferring. The DMA circuitry performs all of the required memory accesses to perform the data transfer to and from the memory, and sends an acknowledgement to the processor when the transfer is completed.

In both cases of memory management in the art the processor has to explicitly perform the management of the memory, that is, to decide whether the desired data structure fits into the available memory space or does not, and where in the memory to store the data. To make such decisions the processor needs to keep track of the regions of memory wherein useful data is stored, and regions that are free (available for data storage). Once that data is processed, and sent out to another device or location, the region of memory formerly associated with the data is free to be used again by new data to be brought into memory. If a data structure fits into the available memory, the processor needs to decide where the data structure will be stored. Also, depending on the requirements of the processing, the data structure can be stored either consecutively, in which case the data structure must occupy one of the empty regions of memory; or non-consecutively, wherein the data structure may be partitioned into pieces, and the pieces are then stored into two or more empty regions of memory.

An advantage of consecutively storing a data structure into memory is that the accessing of this data becomes easier, since only a pointer to the beginning of the data is needed to access all the data.

When data is not consecutively stored into the memory, access to the data becomes more difficult because the processor needs to determine the explicit locations of the specific bytes it needs. This can be done either in software (i.e. the processor will spend its resources to do this task) or in hardware (using a special circuitry). A drawback of consecutively storing the data into memory is that memory fragmentation occurs. Memory fragmentation happens when the available chunks of memory are smaller than the data structure that needs to be stored, but the addition of the space of the available chunks is larger than the space needed by the data structure. Thus, even though enough space exists in the memory to store the data structure, it cannot be consecutively stored. This drawback does not exist if the data structure is allowed to be non-consecutively stored.

Still, a smart mechanism is needed to generate the lowest number of small regions, since the larger the number of small regions that are used by a data structure, the more complex the access to the data becomes (more specific regions need to be tracked) regardless of whether the access is managed in software or hardware as explained above.

A background memory manager (BMM) for managing a memory in a data processing system is known to the inventor. The memory manager has circuitry for transferring data to and from an outside device and to and from a memory, a memory state map associated with the memory, and a communication link to a processor. The BMM manages the memory, determining if each data structure fits into the memory, deciding exactly where to place the data structure in memory, performing all data transfers between the outside device and the memory, maintaining the memory state map according to memory transactions made, and informing the processor of new data and its location. In preferred embodiments the BMM, in the process of storing data structures into the memory provides an identifier for each structure to the processor. The system is particularly applicable to Internet packet processing in packet routers.

Because software-managed memory is costly in terms of developing instructions to figure out which portions of memory within a memory block are free and which are available, a hardware mechanism such as the one described with reference to Ser. No. 09/602,279 enables more efficiency and therefore, cost savings. However, in order to optimize the function of such a hardware controller, a process must be provided to enable integrated and optimum function between hardware control and software control of memory. One of the preferred areas of use for such innovation is in the area of packet processing in data routing over networks.

What is clearly needed is a protocol that enables low fragmented packet queuing and de-queuing using on-board memory and hardware, wherein the memory is controlled in a manner to alleviate management responsibility traditionally assigned to CPU and other processor resources.

SUMMARY OF THE INVENTION

In a preferred embodiment of the present invention a system for allocating storage of incoming data packets into a memory of a packet processor is provided, comprising a first facility mapping a first block of memory of a fixed block size in bytes into an ordered plurality of atomic pages comprising each a fixed byte size, a second facility mapping the same block of memory into ordered virtual pages of different sizes, ranging from a smaller virtual page size equal to the atomic page size up to a larger virtual page size equal to the fixed block size, a third facility to allocate virtual pages as unavailable for storage or de-allocate virtual pages as available for storage, a fourth facility to receive a data packet, ascertain packet size for the received packet, and to determine fit by checking allocation state for virtual pages of a smallest size that is equal to or larger than the packet size, then allocation state for next larger virtual pages, and so on, until a de-allocated, available virtual page is found; and a fifth facility to select a virtual page to store the packet, and to update and mark associated atomic pages in the selected virtual page as available or unavailable for storage, in an ordered manner. After each selection state of all atomic and virtual pages is updated.

In some preferred embodiments the system implemented in hardware. Also in preferred embodiments the second facility maps virtual pages in ascending orders of two from the atomic page size up to the block size. In a particular embodiment the block size is 64 KiloBytes (KB), mapped into 256 atomic pages of 256 Bytes each, and further mapped into 256 virtual pages of 256 bytes each, 128 virtual pages of 512 bytes each, and ascending in powers of two to two virtual pages of 32 KB each, and one virtual page of 64 KB.

In some embodiments there is further a mechanism for enabling groups of virtual pages by size, wherein the fifth facility selects only among enabled groups of virtual pages. In this system the fifth facility selects a de-allocated virtual page for storing the packet only from the enabled virtual page group of the smallest size that is still equal to or larger than the packet size.

In some embodiments there is a second block of memory of the same fixed block size as the first block of memory, mapped in the same way as the first block of memory, wherein a block is selected for storage based on state of enabled virtual page groups in each block, and then a virtual page is selected in the selected block based on fit. In some cases groups of virtual pages are mapped as enabled in an ascending order from a first block to a last block, having the effect of reserving lower-order blocks for smaller packet size.

In another aspect of the invention a data packet router is provided, comprising external ports to receive and send data packets from and to neighboring connected routers, and a packet processor having an on-board memory, and comprising a system for allocating storage of data packets in the on-board memory, the system having a first facility mapping a first block of memory of a fixed block size in bytes into an ordered plurality of atomic pages comprising each a fixed byte size, a second facility mapping the same block of memory into ordered virtual pages of different sizes, ranging from a smaller virtual page size equal to the atomic page size up to a larger virtual page size equal to the fixed block size, a third facility to allocate virtual pages as unavailable for storage or de-allocate virtual pages as available for storage, a fourth facility to receive a data packet, ascertain packet size for the received packet, and to determine fit by checking allocation state for virtual pages of a smallest size that is equal to or larger than the packet size, then allocation state for next larger virtual pages, and so on, until a de-allocated, available virtual page is found, and a fifth facility to select a virtual page to store the packet, and to update and mark associated atomic pages in the selected virtual page in an ordered manner. In preferred embodiments the system for storing is implemented in hardware.

In some embodiments of the router, after each selection by the fifth facility, state of all atomic and virtual pages is updated. Also in some embodiments the second facility maps virtual pages in ascending orders of two from the atomic page size up to the block size. In some preferred embodiments the block size is 64 KiloBytes (KB), mapped into 256 atomic pages of 256 Bytes each, and further mapped into 256 virtual pages of 256 bytes each, 128 virtual pages of 512 bytes each, and ascending in powers of two to two virtual pages of 32 KB each, and one virtual page of 64 KB.

In some cases the hardware system further comprises a mechanism for enabling groups of virtual pages by size, and wherein the fifth facility selects only among enabled groups of virtual pages. In some of these embodiments the hardware system the fifth facility selects a de-allocated virtual page for storing the packet only from the enabled virtual page group of the smallest size that is still equal to or larger than the packet size.

In some preferred embodiments the on-board memory further comprises a second block of memory of the same fixed block size as the first block of memory, mapped in the same way as the first block of memory, wherein the hardware system selects a block for storage based on state of enabled virtual page groups in each block, and then a virtual page is selected in the selected block based on fit.

In another aspect of the invention a method for allocating storage for data packets in a memory of a packet processor is provided, comprising the steps of (a) mapping, by a first facility, a first block of memory of a fixed block size in bytes into an ordered plurality of atomic pages comprising each a fixed byte size, (b) mapping, by a second facility, the same block of memory into ordered virtual pages of different sizes, ranging from a smaller virtual page size equal to the atomic page size up to a larger virtual page size equal to the fixed block size, (c) allocating, by a third facility, virtual pages as unavailable for storage or de-allocating virtual pages as available for storage, (d) receiving a data packet by a fourth facility, ascertaining packet size for the received packet, and determining fit by checking allocation state for virtual pages of a smallest size that is equal to or larger than the packet size, then allocation state for next larger virtual pages, and so on, until a de-allocated, available virtual page is found, and (e) selecting a virtual page by a fifth facility, to store the packet, and updating and marking associated atomic pages in the selected virtual page in an ordered manner.

In some embodiments of the method, in step (b), the second facility maps virtual pages in ascending orders of two from the atomic page size up to the block size. Also in some embodiments the block size is 64 KiloBytes (KB), mapped into 256 atomic pages of 256 Bytes each, and further mapped into 256 virtual pages of 256 bytes each, 128 virtual pages of 512 bytes each, and ascending in powers of two to two virtual pages of 32 KB each, and one virtual page of 64 KB.

In some embodiments there is a mechanism for enabling groups of virtual pages by size, wherein the fifth facility selects only among enabled groups of virtual pages. In some cases the fifth facility selects a de-allocated virtual page for storing the packet only from the enabled virtual page group of the smallest size that is still equal to or larger than the packet size.

In some embodiments of the method there is a second block of memory of the same fixed block size as the first block of memory, mapped in the same way as the first block of memory, wherein a block is selected for storage based on state of enabled virtual page groups in each block, and then a virtual page is selected in the selected block based on fit. In some cases enabled groups of virtual pages are mapped as enabled in an ascending order from a first block to a last block, having the effect of reserving lower-order blocks for smaller packet size.

In various embodiments of the invention taught in enabling description below, for the first time a hardware mechanism and a method is provided for selecting storage location in an on-board memory of a packet processor, wherein fragmentation is held at a minimum, and packets of various sizes may be forced into specific blocks.

BRIEF DESCRIPTION OF THE DRAWING FIGURES

DESCRIPTION OF THE PREFERRED EMBODIMENTS

Figure 1:
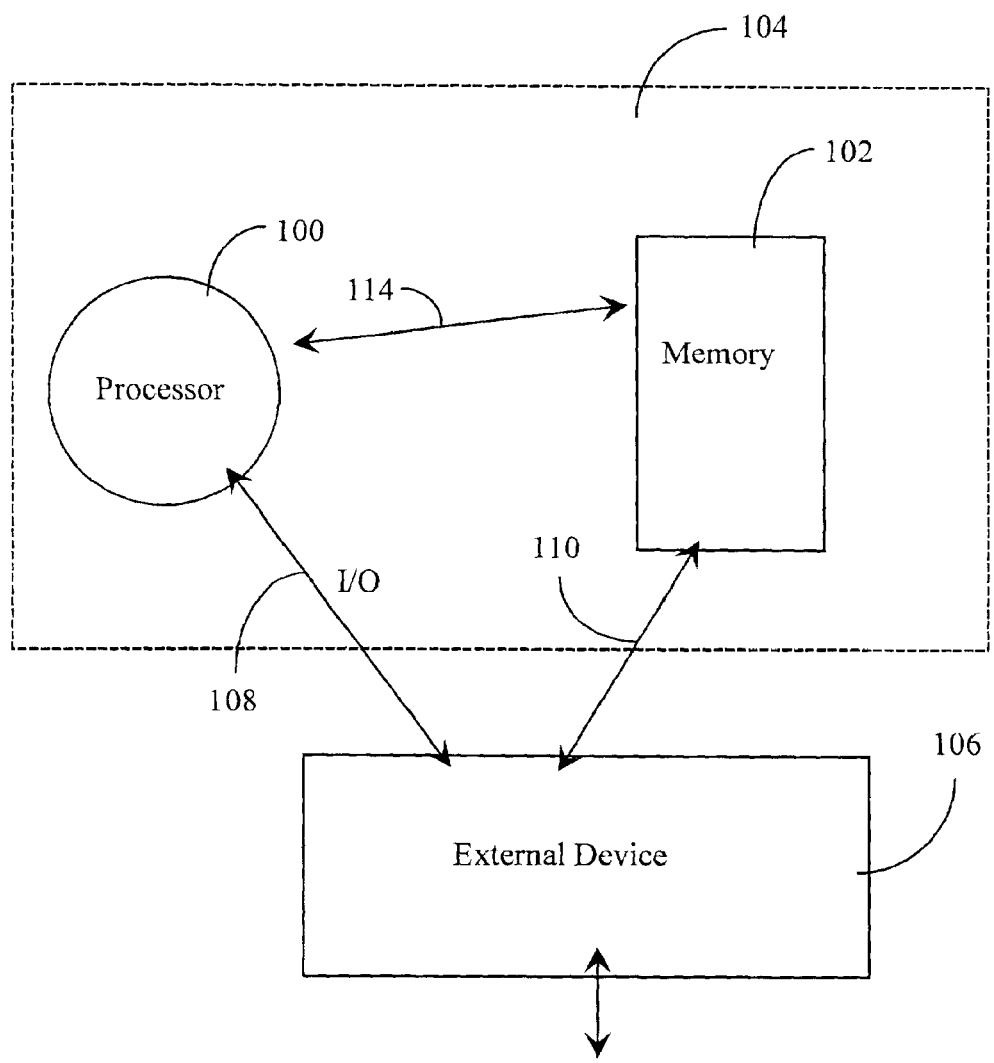
FIG. 1 is a simplified diagram of memory management by direct I/O processing in the prior art.

FIG. 1 is a simplified diagram of memory management in a system 104 comprising a processor 100 and a memory 102 in communication with a device 106. In this example it is necessary to bring data from device 106 into memory 102 for processing, and sometimes to transmit processed data from memory 102 to device 106, if necessary. Management in this prior art example is by processor 100, which sends I/O commands to and receives responses and/or interrupts from device 106 via path 108 to manage movement of data between device 106 and memory 102 by path 110. The processor has to determine whether a data structure can fit into available space in memory, and has to decide where in the memory to store incoming data structures. Processor 100 has to fully map and track memory blocks into and out of memory 102, and retrieves data for processing and stores results, when necessary, back to memory 102 via path 114. This memory management by I/O commands is very slow and cumbersome and uses processor resources quite liberally.

Figure 2:
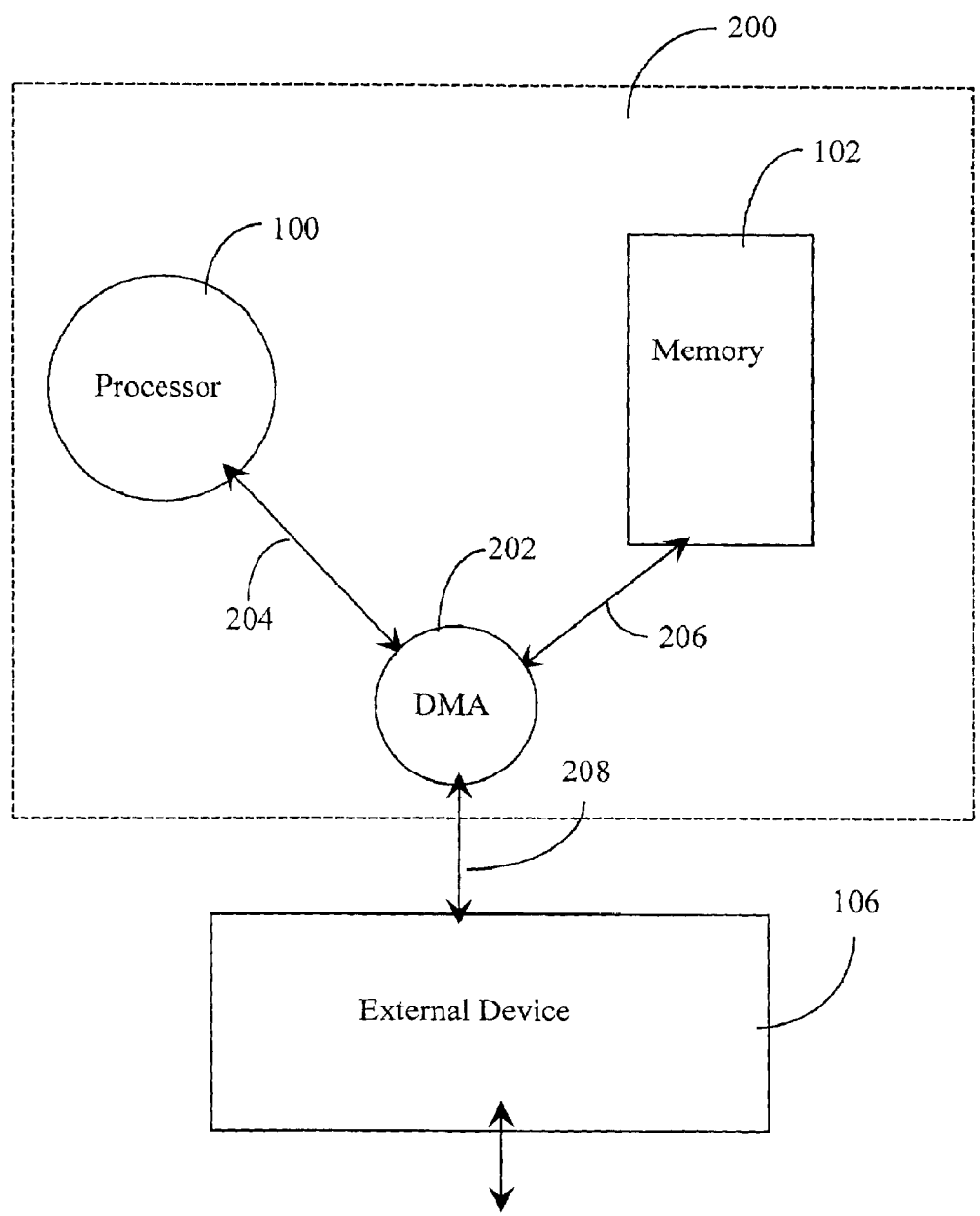
FIG. 2 is a simplified diagram of memory management by direct memory access in the prior art.

FIG. 2 is a simplified diagram of a processor system 200 in the prior art comprising a processor 100, a memory 102 and a direct memory access (DMA) device 202. This is the second of two systems by which data, in the conventional art, is brought into a system, processed, and sent out again, the first of which is by I/O operations as described just above. System 200 comprises a DMA device 202 which has built-in intelligence, which may be programmed by processor 100, for managing data transfers to and from memory 102. DMA device 202 is capable of compatible communication with external device 106, and of moving blocks of data between device 102 and 106, bi-directionally. The actual data transfers are handled by DMA device 202 transparently to processor 100, but processor 100 must still perform the memory mapping tasks, to know which regions of memory are occupied with data that must not be corrupted, and which regions are free to be occupied (overwritten) by new data.

In the system of FIG. 2 DMA processor 100 programs DMA device 202. This control communication takes place over path 204. DMA device 202 retrieves and transmits data to and from device 106 by path 208, and handles data transfers between memory 102 and processor 100 over paths 204 and 206.

In these descriptions of prior art the skilled artisan will recognize that paths 204, 206 and 208 are virtual representations, and that actual data transmission may be by various physical means known in the art, such as by parallel and serial bus structures operated by bus managers and the like, the bus structures interconnecting the elements and devices shown.

Figure 3:
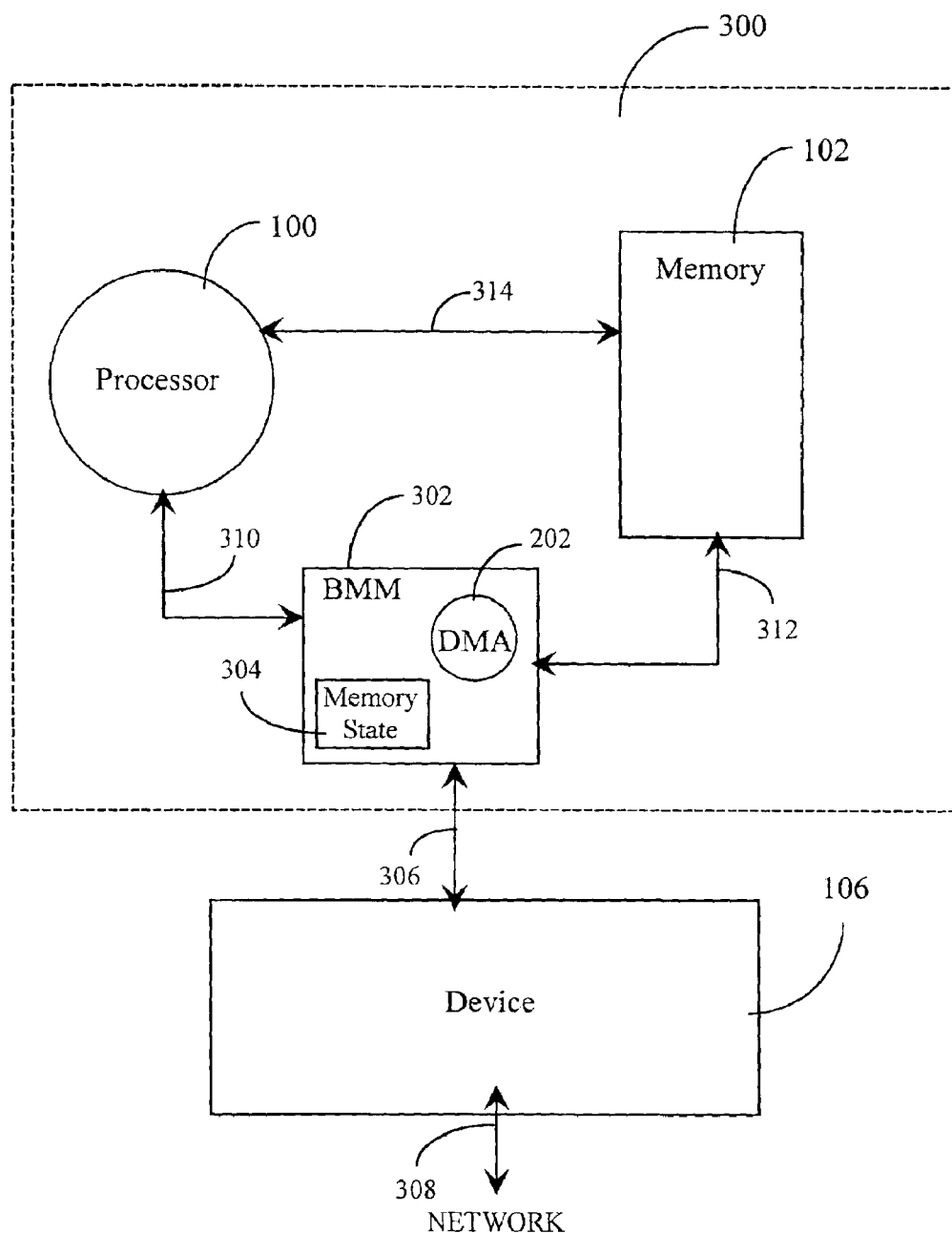
FIG. 3 is a diagram of memory management by a Background Memory Manager in a preferred embodiment of the present invention.

FIG. 3 is a schematic diagram of a system 300 including a Background Memory Manager (BMM) 302 according to an embodiment of the present invention. BMM 302 a hardware mechanism enabled to manage the memory in the background, i.e. with no intervention of the processor to decide where the data structure will be stored in the memory. Thus, the processor can utilize its resources for tasks other than to manage the memory.

The present invention in several embodiments is applicable in a general way to many computing process and apparatus. For example, in a preferred embodiment the invention is applicable and advantageous in the processing of data packets at network nodes, such as in routers in packet routers in the Internet. The packet processing example is used below as a specific example of practice of the present invention to specifically describe apparatus, connectivity and functionality.

In the embodiment of a packet router, device 106 represents input/output apparatus and temporary storage of packets received from and transmitted on a network over path 308. The network in one preferred embodiment is the well-known Internet network. Packets received from the Internet in this example are retrieved from device 106 by BMM 302, which also determines whether packets can fit into available regions in memory and exactly where to store each packet, and stores the packets in memory 102, where they are available to processor 100 for processing. Processor places results of processing back in memory 102, where the processed packets are retrieved, if necessary, by BMM on path 312 and sent back out through device 106.

In the embodiment of FIG. 3 BMM 302 comprises a DMA 202 and also a memory state map 304. BMM 302 also comprises an interrupt handler in a preferred embodiment, and device 106 interrupts BMM 302 when a packet is received. When a packet is received, using DMA 202 and state map 304, the BMM performs the following tasks:

1. Decides whether a data structure fits into the memory. Whether the structure fits into memory, then, is a function of the size of the data packet and the present state of map 304, which indicates those regions of memory 102 that are available for new data to be stored.
2. If the incoming packet in step 1 above fits into memory, the BMM determines an optimal storage position. It was described above that there are advantages in sequential storage. Because of this, the BMM in a preferred embodiment stores packets into memory 102 in a manner to create a small number of large available regions, rather than a larger number of smaller available regions.
3. BMM 302 notifies processor 100 on path 310 when enough of the packet is stored, so that the processor can begin to perform the desired processing. An identifier for this structure is created and provided to the processor. The identifier communicates at a minimum the starting address of the packet in memory, and in some cases includes additional information.
4. BMM updates map 304 for all changes in the topology of the memory. This updating can be done in any of several ways, such as periodically, or every time a unit in memory is changed.
5. When processing is complete on a packet the BMM has stored in memory 102, the processor notifies BMM 302, which then transfers the processed data back to device 106. This is for the particular example of a packet processing task. In some other embodiments data may be read out of memory 102 by MM 302 and sent to different devices, or even discarded. In notifying the BMM of processed data, the processor used the data structure identifier previously sent by the BMM upon storage of the data in memory 102.
6. The BMM updates map 304 again, and every time it causes a change in the state of memory 102. Specifically the BMM de-allocates the region or regions of memory previously allocated to the data structure and sets them as available for storage of other data structures, in this case packets.

It will be apparent to the skilled artisan that there may be many alterations in the embodiments described above without departing from the spirit and scope of the present invention. For example, a specific case of operations in a data packet router was illustrated. This is a single instance eof a system wherein the invention may provide significant advantages. There are many other systems and processes that will benefit as well. Further, there are a number of ways BMM 302 may be implemented to perform the functionality described above, and there are many systems incorporating many different kinds of processors that might benefit.

Low Fragmentation Data Storage

In the following described examples memory management is accomplished in a dynamic multi-streaming processor know to the inventors as XCaliber, which has been described in one or more of the documents incorporated in the cross-reference section above.

Figure 4:
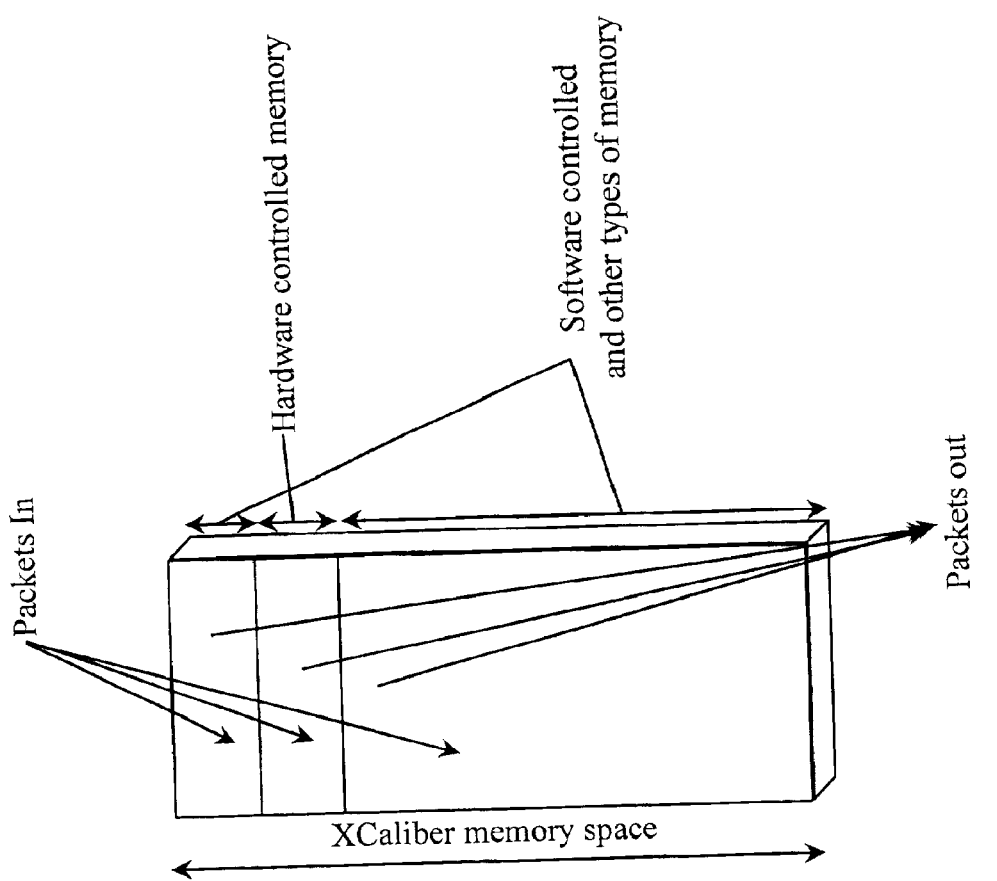
FIG. 4 is a block-diagram illustrating a hardware-controlled memory portion of a total processor memory.

FIG. 4 is a simplified diagram of memory space managed by XCaliber according to an embodiment of the present invention. Shown in the diagram are sections of memory space of the XCaliber multi-streaming processor that are hardware controlled, software controlled, and other types of memory not specifically described. In this example, a specific section is labeled Hardware Controlled. The memory space of this section is analogous to LPM 219 described with reference to FIG. 2 of Ser. No. 09/737,375 or memory 102 described with reference to FIG. 3 of Ser. No. 09/602,279. In this example, only a specified section of the total available memory of XCaliber is designated as hardware-controlled.

Also indicated by directional arrows in this example are Packets In that are received at the processor from a network such as, for example, the well-known Internet network. Packets Out, similarly indicated in this example by directional arrows, indicate data packets that have been processed by XCaliber and are being uploaded for routing to designated destinations either internal to the router or over a network or networks, which may include the Internet network, to other routing points.

The section of hardware-controlled memory illustrated herein is controlled by hardware that is provided according to a preferred embodiment of the present invention and enhanced to manage the memory according to a provided protocol. In an embodiment of this invention it is preferred that incoming data packets are stored into and read out of hardware controlled memory so that the central processing unit (CPU) or other processing resources do not have to perform costly operations involved in storing and reading out the data.

Although it is not explicitly indicated in this example, but is further described below, the section of memory labeled as hardware-controlled memory is divided into a plurality of manageable blocks. It is possible in an embodiment of this invention that software can control none, one, or more memory blocks and leave those blocks not controlled by software to control of the hardware algorithm. Configuration flags are provided for indicating assigned software control of any one or more of memory blocks. When such a flag is set the hardware controller will not store any incoming data packets into the flagged block.

The protocol provided in embodiments of this invention, defined by a specific algorithm, determines if any incoming data packets fit into any hardware-controlled blocks of memory. If incoming data packets fit into any of the hardware-controlled blocks, the hardware algorithm enables a computation to determine which blocks within the hardware-controlled memory will be selected that will accommodate incoming data packets.

The novel protocol of the present invention introduces a concept of virtual and atomic pages as data storage containers of the hardware-controlled memory. In a preferred embodiment, Virtual pages comprise a number of atomic pages. A goal of the present invention is to be able to reduce fragmentation that typically occurs when queuing and de-queuing data packets.

Figure 5:
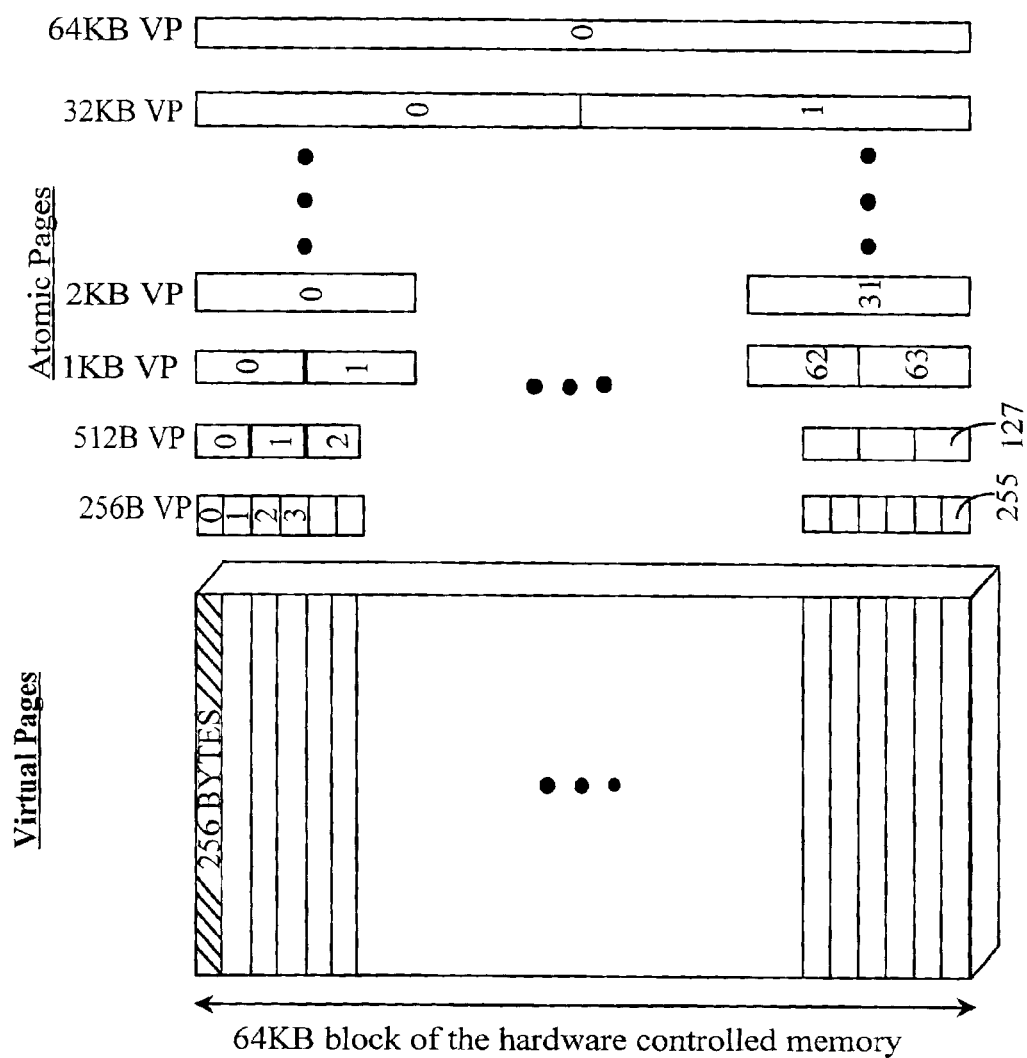
FIG. 5 is a block-diagram illustrating layout of virtual pages for a division of the hardware-controlled memory of FIG. 4 according to an embodiment of the present invention.

FIG. 5 is a block-diagram illustrating an example of a virtual page according to an embodiment of the present invention. This example illustrates just one of a plurality of divided sections of the hardware-controlled memory described above with reference to FIG. 4.

In actual practice, the hardware-controlled portion of memory of FIG. 4 is divided into 4 blocks each having 64 Kb total memory space. Therefore, a total size of the hardware-controlled memory of FIG. 4 is 256 Kb. This should, however, not be construed as a limitation of the present invention, as there are a number of possible division schemes as well as possible differing amounts of provided on-board memory. In this example only a single block of 64 Kb is represented for simplicity in description.

The 64 KB block of this example comprises a plurality of atomic page divisions having 256 bytes of memory space each. Therefore, there are in this example, 256 atomic pages making up a single 64 Kb block and 1024 atomic pages defining the four 64 Kb divisions of the total hardware-controlled memory referred to in the example of FIG. 4 above.

Graphically represented to the right of the 64 Kb memory block in this example are columns representing some possible allocated sizes of virtual pages. For example, a 256-byte virtual page (VP) size may exist that comprises a single atomic page (1:1) thus providing 256 (0–255) VPs per 64 Kb block. A 512-byte VP size may exist with each VP comprising 2 atomic pages (2:1) thus providing 128 (0–127) VPs per block. Similarly, reading further columns to the right, virtual pages may comprise 1 Kb of memory (0 through 63 atomic pages), 2 Kb of memory (0 through 31 atomic pages) and so on, according to power of 2 increments, up to a single 64 Kb VP comprising the entire 64 Kb block.

An enhanced hardware mechanism is provided and termed HAL by the inventor, and is subsequently referred to as HAL in this specification. HAL computes and maintains a flag for each virtual page within a controlled memory block in order to determine whether a virtual page has been allocated for data storage or not. The status, including size of all atomic pages is, of course, known to HAL to make computations regarding whether or not to store an incoming data packet in a particular space.

Figure 6A:
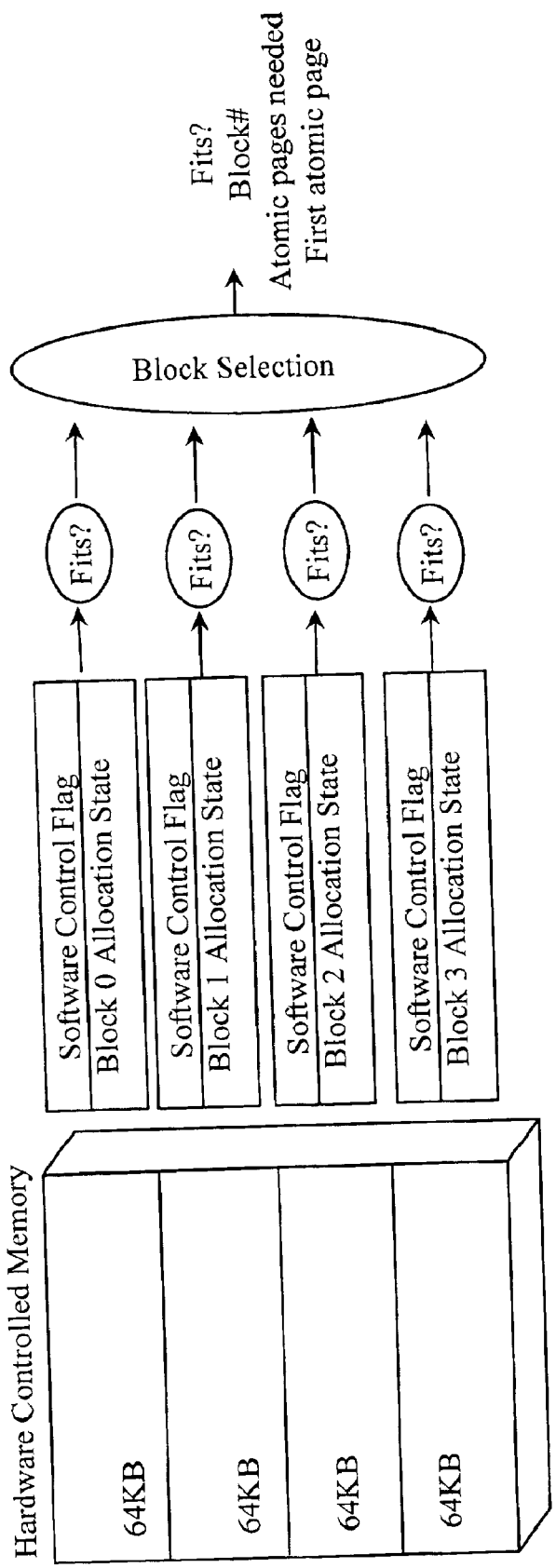
FIG. 6a is a block-diagram illustrating a Fits Determination logic according to an embodiment of the present invention.

FIG. 6a is a block diagram illustrating a first part of a two-part process of storing data packets into hardware-controlled memory according to an embodiment of the present invention. In the two-part function, HAL makes a determination whether a particular incoming data packet fits into any of the blocks of the hardware-controlled memory. If a packet fits, it is determined how many atomic pages of memory space will be needed to store the data packet. After packet storage, the used space is marked as allocated for storage of the packet. When the packet is read out of queue, the formerly allocated space is then de-allocated or marked as free space for consideration in future storage.

As was previously described above, the hardware controlled memory is divided into a plurality blocks of a fixed size. In practice in this example, total memory controlled by hardware (HAL) is 256 KB divided into 4 sub-blocks of 64 KB each. As described with reference to FIG. 5 of this specification, each 64 KB block is divided into smaller sub-blocks of atomic pages of 256 bytes each, which are used to construct virtual pages.

At left in FIG. 6a, there is illustrated 4 64 Kb blocks of memory, which taken together equate to a total memory that is controlled by HAL. Each block, as previously described, may be hardware or software controlled. If a block is software controlled, it will be identified as such and HAL will not utilize the block for packet storage. To the right of the 4 64 Kb blocks, there is illustrated a state of indication for each block. For example, an area is set aside to indicate if a block is software controlled. If this area does not indicate by flag that it is software controlled, then an allocated/de-allocated indication will be present. This is indicated by "Block 0 state through block 3 state. It is noted herein that computation by HAL is performed in parallel for each 64 Kb block.

If it is determined by HAL that there is available hardware controlled memory and that one or more blocks have sufficient space that is de-allocated, or does not hold data, then HAL determines if the packet fits into any of the eligible spaces. It is noted herein that the byte size of an incoming data packet is appended to the packet in this example in the first 2 bytes of the packet header. This is a convenience in a preferred embodiment, but is not limiting for purposes of the invention. In cases where no size is appended, the hardware algorithm would simple receive all of the packet, and when it detects that the packet has been completely received, it would compute the size of the packet. In this way, (either way) HAL may efficiently determine eligible spaces to store the packet. In this scheme, data packets are stored consecutively and a goal is to have all of a packet contained in a virtual page to reduce fragmentation.

Blocks are selected for storage based on eligibility, and in some cases priority. Information generated by HAL in case of packet fit includes a block #, the total number of atomic pages required to store the packet, and the location identifier of the first atomic page marking the beginning of the stored data packet. Knowing the first atomic page and the size of the data packet stored is sufficient to simplify reading the packet out of the hardware-controlled memory, since packets are consecutively stored.

Whether hardware or software controlled, status of selected blocks of memory must be computed and maintained by whichever entity (hardware or software) is controlling selected blocks of memory.

To select appropriate blocks of memory, HAL must keep track of regions of memory wherein active data is stored and regions that are free and available for storage. Once data packets are sent out to another device or location, those areas of memory associated with that data are de-allocated and available to be used again for storage of new data packets to be stored into the memory. Once fit determination is made, the HAL records a block number, atomic pages needed for storage, and at least a first atomic page number as a data identifier, and provides that data identifier to the multi-streaming processor for management of data. If a fit determination cannot be made, the controlling entity (HAL or software) may have the option of storing data packets in external storage memory or dropping data packets.

Figure 6B:
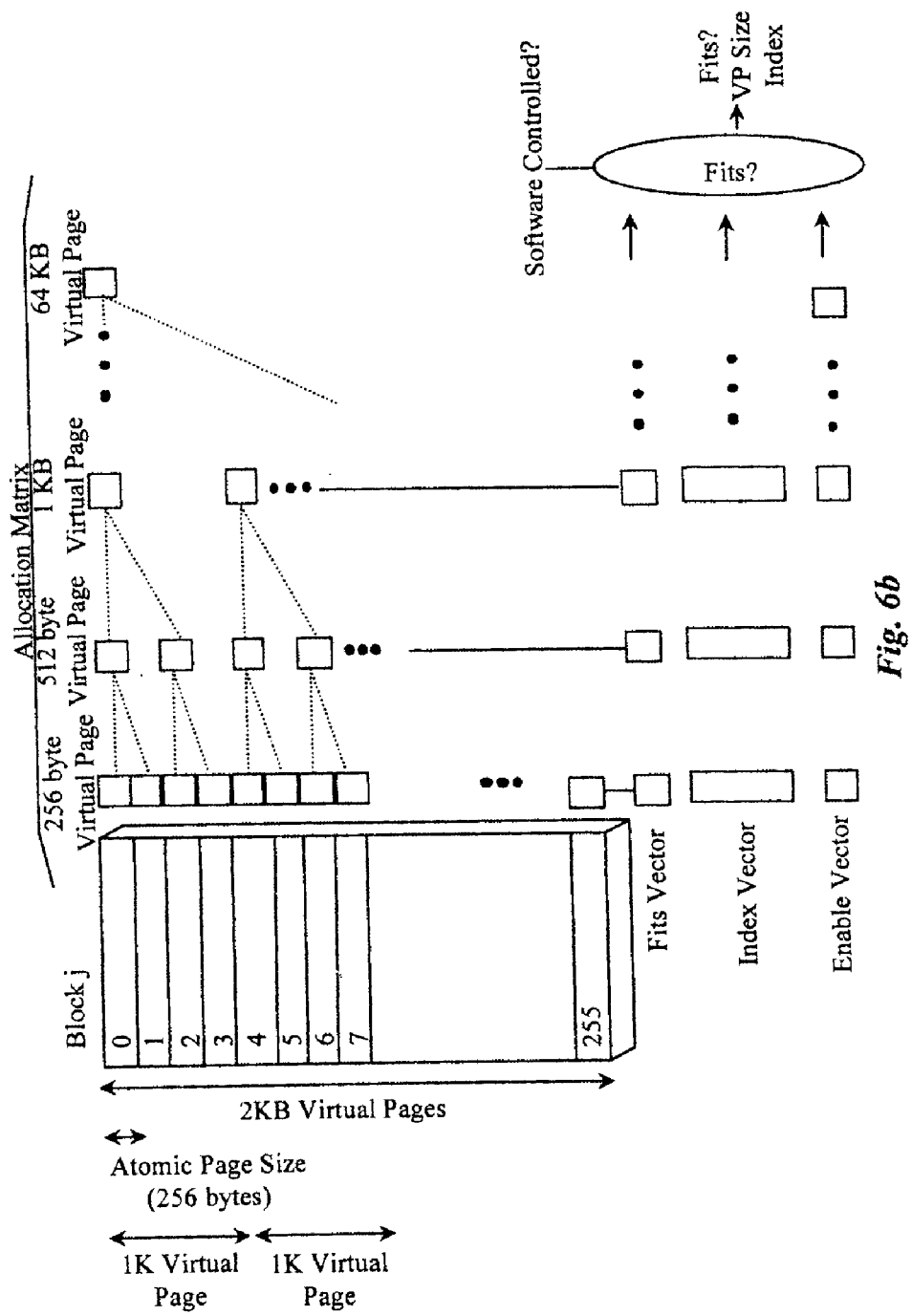
FIG. 6b is a block diagram illustrating an allocation matrix according to an embodiment of the present invention.

FIG. 6b is a block-diagram illustrating a virtual page allocation matrix of atomic pages needed to store data packet and the re-computation (allocated/de-allocated) of the state of virtual pages. Allocation of atomic pages is accomplished by fit determination logic established by the allocation matrix that is comprised of the state of each of all virtual pages per block. Computation is updated each time one or more atomic pages is allocated or de-allocated and is an input back into the determination logic.

The allocation matrix maintains computation of allocated and de-allocated virtual pages relative to 256 byte, 512 byte, 1 Kb, and other power-of-two increments up to a 64 Kb virtual page. Allocated and De-allocated state information is submitted as input to the fits determination logic for each packet as described above.

In this example, Block j has 0–255 atomic pages representing the smallest increment of 256 bytes. The power-of-two increments of construction are 256B virtual pages, 512 B virtual pages, 1 KB virtual pages, up to a 64 KB virtual page. The instant mapping scheme selectable by power of two increments is a programmable feature that may be programmed on the fly during packet processing.

Motivation for changing the memory mapping scheme with regard to the size of virtual pages allocated for packet storage may, in one embodiment, be derived from statistical averaging of the size of data packets entering a data port over a given, and also programmable, period of time. A goal of the present invention is to continually select the best mapping scheme that enables data storage with minimum fragmentation. Therefore, the way that the local packet memory (hardware controlled) is mapped can vary according to need. The exact criteria for determining when to change the mapping scheme may be established using a threshold scheme that automatically triggers a dynamic re-mapping of hardware-controlled memory. Because of this flexibility, which is not available in prior art memory addressing schemes, fragmentation may be kept to a minimum. However, a trade-off exists in that using a power of 2 to define selectable VP sizes is not necessarily the best way to reduce fragmentation. It is utilized in a preferred embodiment because it greatly simplifies computation, requiring minimum circuitry, providing for a smaller and faster chip implementation.

The primary factors of concern in this specification are an Allocation Matrix, a Fits Vector, and an Index Vector. These primary factors are defined as follows:

AllocationMatrix[VPSize][VPIndex]: indicates whether virtual page number VPIndex of size VPSize is already allocated or not.

FitsVector[VPSize]: indicates whether a block has at least one non-allocated virtual page of size VPSize.

IndexVector[VPSize]: if FitsVector[VPSize] is asserted, IndexVector[VPSize] contains an index of a non-allocated virtual page or pages of size VPSize.

Determination of VP size for any one of a plurality of hardware managed blocks is dynamically programmed and, in some cases, reprogrammed according to learned results of operation as previously described above. A factor defining this ongoing determination is termed EnableVector [VPSize].

The above-described factors always remain in an undefined state for any block managed by software instead of hardware.

A supporting algorithm expressed in software language for the fits determination logic (for a data packet of size s bytes) is:

1) Fits logic: Check, for each of the blocks, whether the data packet fits in or not. If it fits, remember the virtual page size and the number of the first virtual page of that size.

```
For All Block j Do (can be done in parallel):
    Fits[j] = (s <= VPSize) AND FitsVector[VPSize] AND
              Not SoftwareOwned
        where VPSize is the smallest possible page size.
    If (Fits[j])
        VPIndex[j] = Index Vector[VPSize]
        MinVPS[j] = VPSize
    Else
              MinVPS[j] = <Infinit>
```

2) Block selection: The blocks with the smallest virtual page (enabled or not) that is able to fit the data packet in are candidates. The block with the smallest enabled virtual page is selected.

```
If Fits[j] = FALSE for all j Then
    <Packet does not fit in hardware-controlled memory>
Else
    C = set of blocks with smallest MinVPS AND Fits[MinVPS]
    B = block# in C with the smallest enabled virtual page
        (if more than one exists, pick the smallest block
number)
    If one or more blocks in C have virtual pages enabled Then
        Index = VPIndex[B]
```

-continued

```
        VPSize = MinVPS[B]
        NumAPs = ceil(S/256)
        packetPage = (B*64KB + Index*VPSize) >> 8
    Else
        <Packet does not fit in hardware-controller memory>
```

A packetPage is an atomic page number of the first atomic page that a data packet will occupy in hardware-controlled memory. The packetPage is offset within hardware-controlled memory and can be used to quickly identify and access all data of a packet stored consecutively after that page. The total number of atomic pages (NumAPs) needed to store a data packet is calculated and allocated. Data packet size is determined by examining the first 2 bytes of the packet header as previously described. Allocation of atomic pages for a selected block (j) is determined as follows:

The allocation status of atomic pages in AllocationMatrix [Apsize][j . . . k], j being the first atomic page and k the last one (k−j+1=NumAPs), are set to be allocated.

The allocation status of virtual pages in AllocationMatrix [r][s] is updated following the mesh structure shown in FIG. 6b: a $2^{k+1}$-byte virtual page is allocated if any of the two $2^k$-byte virtual pages that it is composed of is allocated.

Figure 7A:
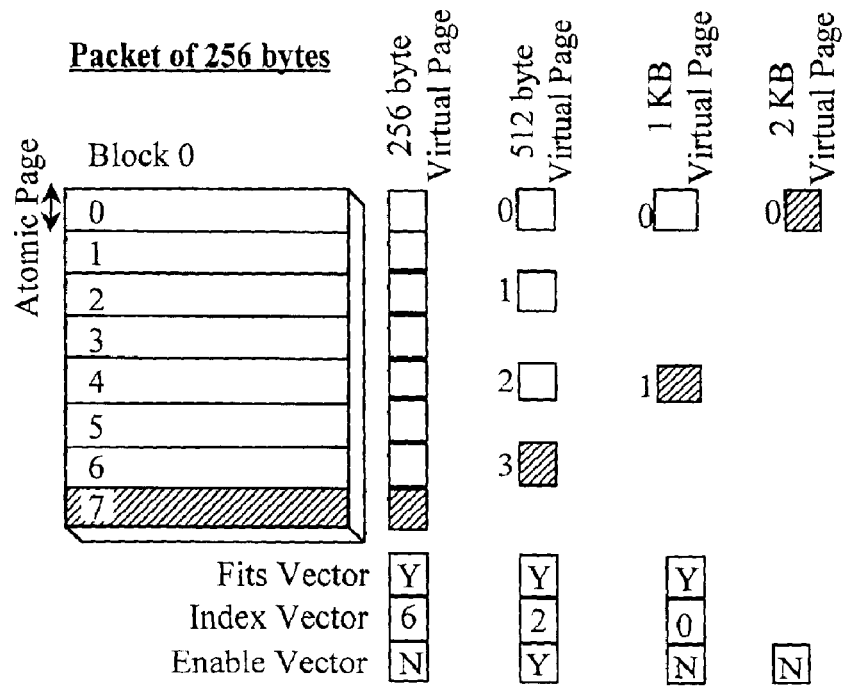
FIGS. 7a through 8d are block-diagrams illustrating a sequence of packet storage involving a plurality of different sized data packets according to an embodiment of the present invention.

FIGS. 7a through 8d are block diagrams illustrating allocation of atomic (and virtual) pages by HAL. The collective diagrams numbering 8 in total are associated in an ongoing sequence of page allocation and packet storage. The 8 diagrams are further associated in sets of two memory blocks each, for example, FIGS. 7a and 7b representing a first sequence utilizing 2 memory Blocks 0 and 1. In actual practice, there are 4 memory blocks within hardware-controlled memory. The inventor illustrates 2 Blocks 0 and 1, each comprising 2 KB of memory for purpose of simplifying explanation.

Referring now to FIG. 7a, assume that Block 0 is hardware controlled, empty of data, and selected for packet storage. The size of a packet for storage is 256 bytes as is indicated above the block. Options for virtual memory allocation in variable sized virtual pages are displayed in columns to the right of Block 0 in increments of powers of 2. The smallest size page is an atomic page of 256 bytes. Therefore in Block 0 there are 8 atomic page divisions 0–7 adding up to 2 KB (total memory). In the first column labeled 256-byteVirtual Page, there is one page available (0–7) for each atomic division 0–7 because they are of the same size. In the next column labeled 512-byte Virtual Page, there are only 4 available virtual pages (0–3) representing total memory because of the power of 2 rule. The remaining columns labeled 1 KB Virtual Page and 2 KB Virtual Page (VP) are presented accordingly using the power of 2 rule.

Immediately below Block 0 is a columned table representing values of three Vectors described previously in this specification. These are, reading from top to bottom, Fits Vector, Index Vector, and Enable Vector. The values presented in the table are associated with the Virtual Page columns. In this example, atomic division 7 is crosshatched indicating current cycle VP allocation of a 256-byte packet. Indication of the VP allocation by cross-hatching is extended across the presented columns in each VP Size category. The cross-hatching in this example indicates that the corresponding atomic page is allocated. The virtual page that contains this atomic page is then not available.

HAL computes and selects the most optimum storage space for the packet based on determined and chosen values represented in the Vector table for each column. The Enable Vector is a preprogrammed constant programmed for each power of 2 columns. The values of yes (Y) or no (N) represented for each column indicate whether or not the function of looking for an available Virtual Page in that column is enabled or not. The specific determination of enabling or disabling consideration of a specific size Virtual Page during a computation cycle depends on outside considerations such as knowledge of average size packets arriving at a port over a given period of time, and any desire to reserve certain size Virtual Pages in a given Block for storage of a specified size or size range of data packets. The Enable Vector is a programmable optimization tool to enable optimum data storage with even less fragmentation.

The Fits Vector is a determination of whether a packet will fit into an available Virtual Page as determined by known size of the packet, and the Index Vector is a pointer to a next available Virtual Page in each size column for fitting a packet. While the Fits Vector is result-oriented (computed result), the Index Vector is selectable in case there is a plurality of Index slots empty of data and available for packet storage. For optimum data storage the last available VP that fits a packet is chosen for storage. It could also be the first available. Either way will work, as long as it is either the last available or the first available.

In this example, it is determined that for selected Block 0, a packet of the size of 256-bytes will fit in a 256-byte virtual page (indicated by cross hatching). In the event of storage of the packet in a 256-byte virtual page, an Index Vector of 6 (or the next 256-byte slot) is flagged for the next available "page" in memory for a next 256-byte packet. This represents the most optimum storage use through consecutive storage and no fragmentation, using the scheme of power-of-two virtual pages and fixed size of atomic pages. The packet will also fit in a 512-byte virtual page, a 1 KB virtual page, and in a 2 KB virtual page. A tabled Y for Enable Vector indication is not required in the case of a 2 KB virtual page as that page represents the total memory selected.

If the 256-byte packet is stored in a 512 Virtual Page it would occupy a block in that column representing atomic divisions 6 and 7 within Block 0 according to power of 2. In this case the Vectors read Y=fits, 2 (chosen as pointer for next available 512-byte Virtual Page), and Y=enabled for consideration. If the packets coming in average between 256 and 512 bytes, it is logical to reserve 512 byte pages as indicated by Enable Vector value of Y for that column. It is reminded that there are three other blocks in actual practice that can be hardware controlled.

Figure 7B:
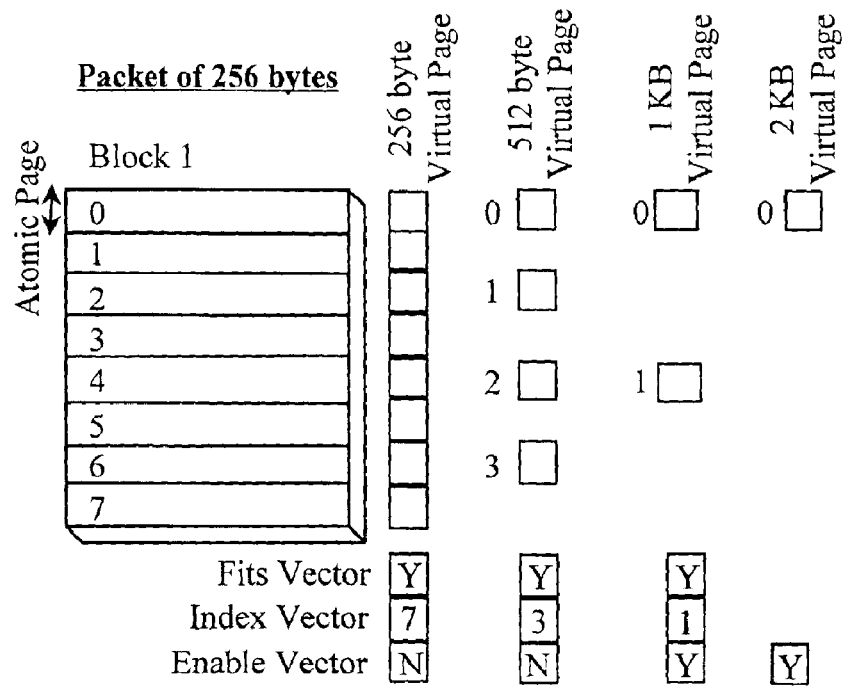

Referring now to FIG. 7*b*, Block 1 represents the other hardware-controlled memory block of this example. The absence of any activity designated by cross-hatching simply means that Block 1 has not been selected for packet storage in the first cycle.

Figure 7C:
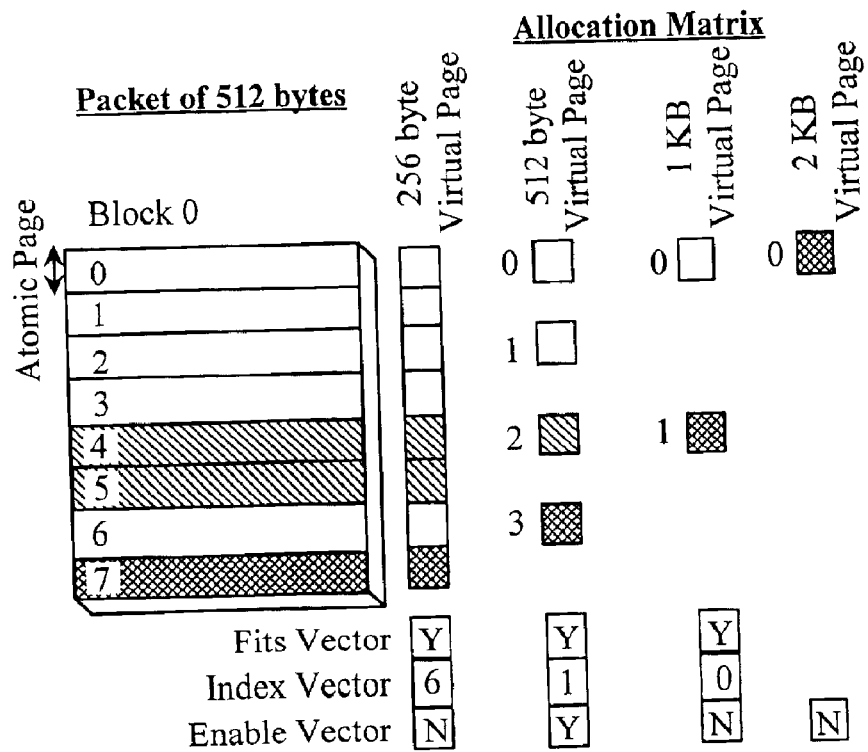
Figure 7D:
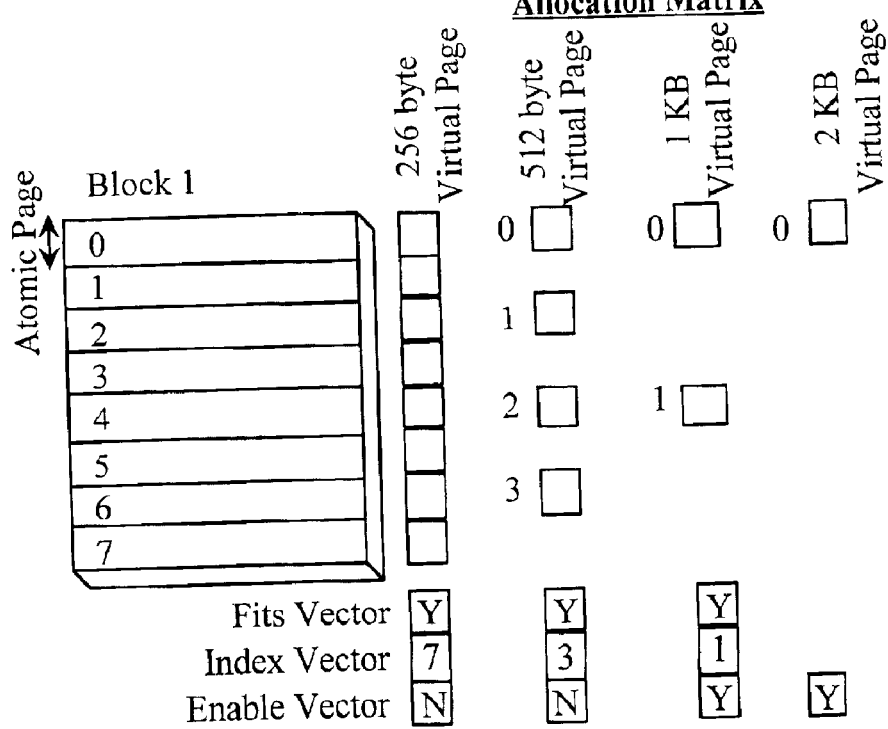

Referring now to FIG. 7*c*, the activity represented in FIG. 7*a* is present in Block 0 as double crosshatched blocks for the packet of 265-bytes. For a next packet of 512-bytes in the next computation cycle, Block 0 in the column 512-bytes has atomic pages 4 and 5 allocated for receiving the 512-byte packet. This allocation resulted from the previous index vector of 2 represented with respect to FIG. 7*a*. In this sequence, only the index vector value of 1 in the 512-byte column has changed indicating that block as the next available 512-byte VP for a next packet of that size or smaller. Referring now to FIG. 7*d*, an absence of cross-hatching indicates that Block 1 was not selected for packet storage in the current cycle.

Figure 8A:
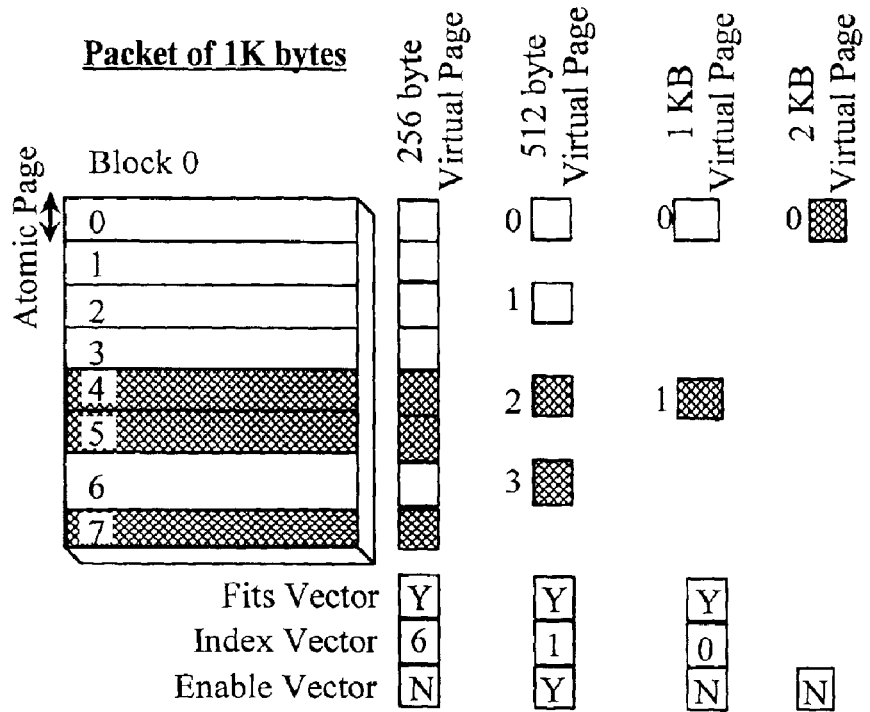

Referring now to FIG. 8*a*, the sequence now must deal with fits determination and allocation for a 1 KB data packet as is indicated above Block 0. In this example, the previous activity described with reference to FIGS. 7*a* (256-byte) and 7*c* (512-byte) is illustrated herein as double crosshatched blocks indicating past allocation and current ineligibility for consideration in this current cycle. It is also noted that neither column (1 KB) nor column (2 KB) is enabled. Even though a 1 KB block may fit in the open VP in the 1 KB column, Block selection is deferred to Block 1 illustrated with reference to FIG. 8*b*. That is to say that Block 0 represented in FIG. 8*a* is not selected for storage of the 1 KB packet.

Figure 8B:
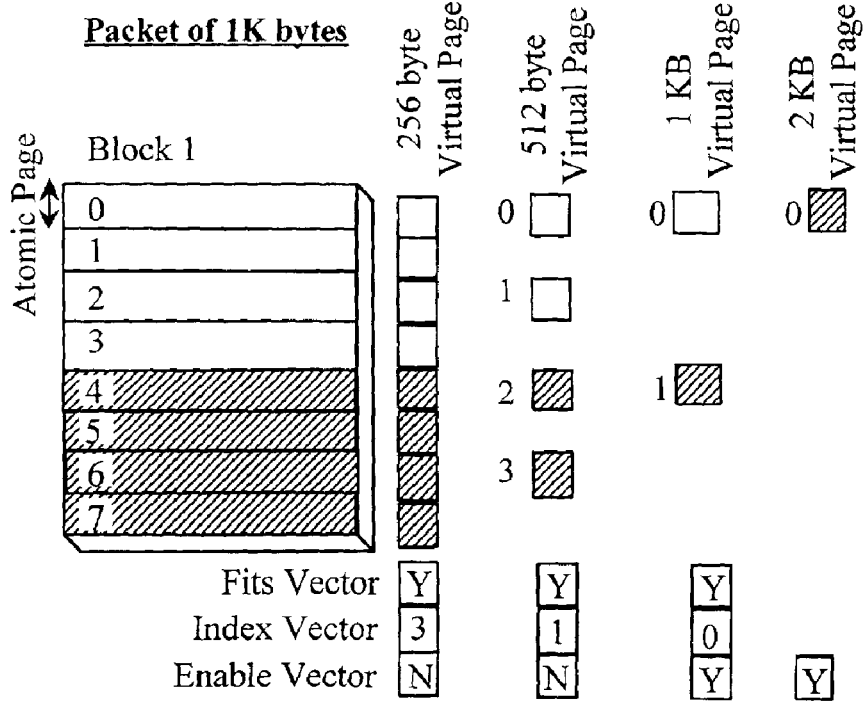

Referring now to FIG. 8*b*, Fits Vector is positive (Y) for all size columns. Atomic divisions 4–7 are allotted for storage of the 1 KB packet in the current cycle as indicated by crosshatching. Index Vector 3 represented in the 256-byte VP column indicates the next available storage index (VP) in the next cycle. It is noted herein that Enable Vector values are positive in the 1 KB and 2 KB columns. In the next cycle, there will be available 4 256-byte VPs (Index Vector 3), 2 512-byte VPs (Index Vector 1), and 1 KB VP (Index Vector 0), available for consideration for storage of a next packet. It is noted that VP 2-KB is not considered in the algorithm for a next cycle be cause it has been allotted.

Figure 8C:
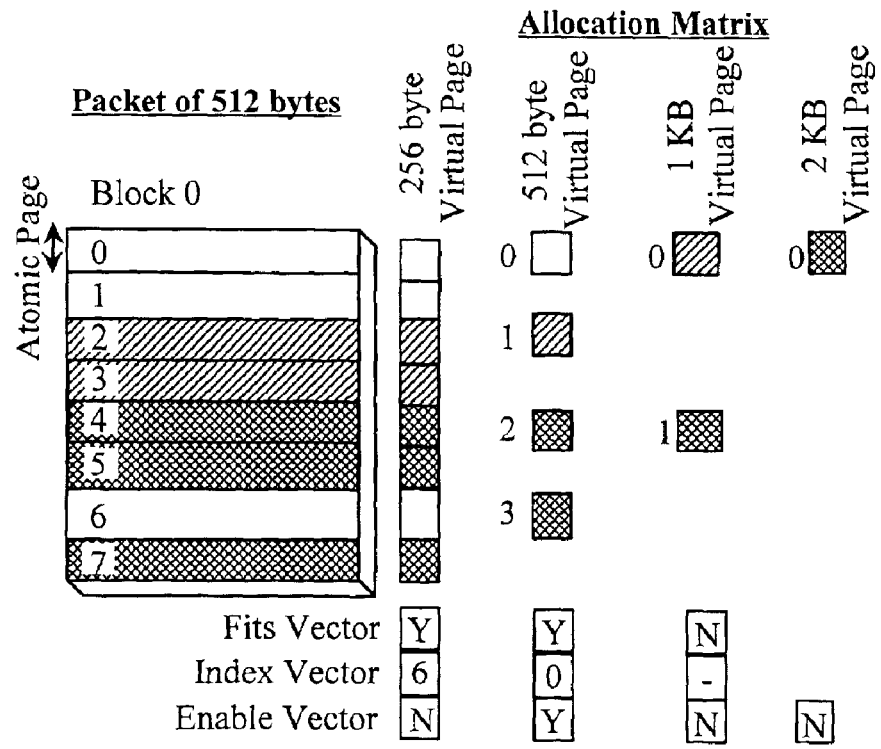
Figure 8D:
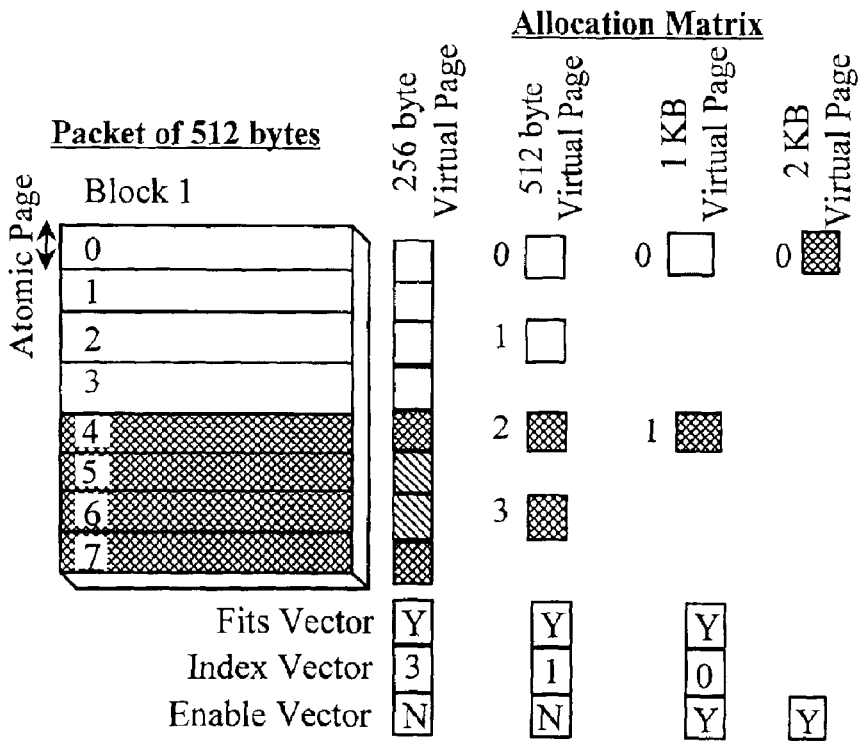

FIGS. 8*c* and 8*d* illustrate further operations involving packets of 512 bytes, and can be understood in light of the above descriptions.

Figure 9:
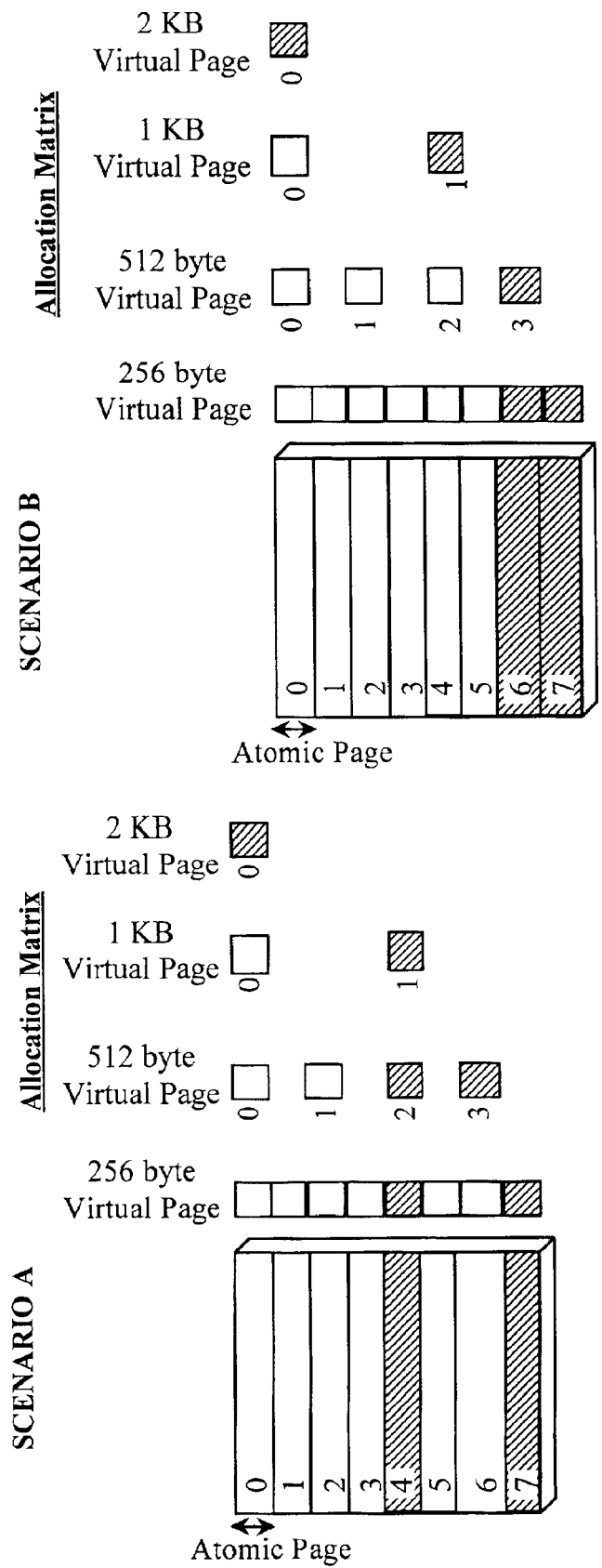
FIG. 9 is a block diagram illustrating a comparison between consecutive and non-consecutive data storage.

FIG. 9 is an illustration of how memory space is better utilized by consecutive storage according to an embodiment of the present invention. This example illustrated two scenarios, A and B, wherein two 256-byte data packets are stored in a block. In SCENARIO A, a 256-byte virtual page is randomly chosen, whereas in SCENARIO B, the largest index vector is always chosen. As can be seen, the block in SCENARIO A only allows two 512-byte virtual pages to be considered at a next round whereas the block in SCENARIO B allows three VPs. Both, however, allow the same number of 256-byte data packets since this is the smallest allocation unit. The same optimization may be obtained by choosing the smallest virtual page index number all the time.

It is noted herein that assignment of Virtual Pages as explained in the examples of FIGS. 7*a* through FIG. 9 is performed in parallel for all memory blocks of hardware-controlled memory that are not flagged for software control. It will be apparent to one skilled in the art that the embodiments of the invention described in this specification are exemplary, and may vary in a multitude of ways without departing from the spirit and scope of the present invention. It will also be apparent to one skilled in the art that many alternatives, variations, and configurations are possible and the scope of the invention is limited only by the claims that follow.

What is claimed is:

1. A system for allocating storage of incoming data packets into a memory of a packet processor, comprising:

a first facility mapping a first block of memory of a fixed block size in bytes into an ordered plurality of atomic pages comprising each a fixed byte size;

a second facility mapping the same block of memory into ordered virtual pages of different sizes, ranging from a smaller virtual page size equal to the atomic page size up to a larger virtual page size equal to the fixed block size;

a third facility to allocate virtual pages as unavailable for storage or de-allocate virtual pages as available for storage;

a fourth facility to receive a data packet, ascertain packet size for the received packet, and to determine fit by checking allocation state for virtual pages of a smallest size that is equal to or larger than the packet size, then allocation state for next larger virtual pages, and so on, until a de-allocated, available virtual page is found; and a fifth facility to select a virtual page to store the packet, and to update and mark associated atomic pages in the selected virtual page as available or unavailable for storage, in an ordered manner;

characterized in that, after each selection by the fifth facility, state of all atomic and virtual pages is updated.

2. The system of claim 1 implemented in hardware.

3. The system of claim 2 wherein the second facility maps virtual pages in ascending orders of two from the atomic page size up to the block size.

4. The system of claim 3 wherein the block size is 64 KiloBytes (KB), mapped into 256 atomic pages of 256 Bytes each, and further mapped into 256 virtual pages of 256 bytes each, 128 virtual pages of 512 bytes each, and ascending in powers of two to two virtual pages of 32 KB each, and one virtual page of 64 KB.

5. The system of claim 2 further comprising a mechanism for enabling groups of virtual pages by size, wherein the fifth facility selects only among enabled groups of virtual pages.

6. The system of claim 5 wherein the fifth facility selects a de-allocated virtual page for storing the packet only from the enabled virtual page group of the smallest size that is still equal to or larger than the packet size.

7. The system of claim 5 further comprising a second block of memory of the same fixed block size as the first block of memory, mapped in the same way as the first block of memory, wherein a block is selected for storage based on state of enabled virtual page groups in each block, and then a virtual page is selected in the selected block based on fit.

8. The system of claim 7 wherein enabled groups of virtual pages are mapped as enabled in an ascending order from a first block to a last block, having the effect of reserving lower-order blocks for smaller packet size.

9. A data packet router comprising:

external ports to receive and send data packets from and to neighboring connected routers; and a packet processor having an on-board memory, and comprising a system for allocating storage of data packets in the on-board memory, the system having a first facility mapping a first block of memory of a fixed block size in bytes into an ordered plurality of atomic pages comprising each a fixed byte size, a second facility mapping the same block of memory into ordered virtual pages of different sizes, ranging from a smaller virtual page size equal to the atomic page size up to a larger virtual page size equal to the fixed block size, a third facility to allocate virtual pages as unavailable for storage or de-allocate virtual pages as available for storage, a fourth facility to receive a data packet, ascertain packet size for the received packet, and to determine fit by checking allocation state for virtual pages of a smallest size that is equal to or larger than the packet size, then allocation state for next larger virtual pages, and so on, until a de-allocated, available virtual page is found, and a fifth facility to select a virtual page to store the packet, and to update and mark associated atomic pages in the selected virtual page in an ordered manner.

10. The router of claim 9 wherein the system for storing is implemented in hardware.

11. The router of claim 10 characterized in that, after each selection by the fifth facility, state of all atomic and virtual pages is updated.

12. The router of claim 11 wherein the second facility maps virtual pages in ascending orders of two from the atomic page size up to the block size.

13. The router of claim 12 wherein the block size is 64 KiloBytes (KB), mapped into 256 atomic pages of 256 Bytes each, and further mapped into 256 virtual pages of 256 bytes each, 128 virtual pages of 512 bytes each, and ascending in powers of two to two virtual pages of 32 KB each, and one virtual page of 64 KB.

14. The router of claim 11 wherein the hardware system further comprises a mechanism for enabling groups of virtual pages by size, and wherein the fifth facility selects only among enabled groups of virtual pages.

15. The router of claim 14 wherein, in the hardware system the fifth facility selects a de-allocated virtual page for storing the packet only from the enabled virtual page group of the smallest size that is still equal to or larger than the packet size.

16. The router of claim 14 wherein the on-board memory further comprises a second block of memory of the same fixed block size as the first block of memory, mapped in the same way as the first block of memory, wherein the hardware system selects a block for storage based on state of enabled virtual page groups in each block, and then a virtual page is selected in the selected block based on fit.

17. A method for allocating storage of data packets in a memory of a packet processor, comprising the steps of:

(a) mapping, by a first facility, a first block of memory of a fixed block size in bytes into an ordered plurality of atomic pages comprising each a fixed byte size;

(b) mapping, by a second facility, the same block of memory into ordered virtual pages of different sizes, ranging from a smaller virtual page size equal to the atomic page size up to a larger virtual page size equal to the fixed block size;

(c) allocating, by a third facility, virtual pages as unavailable for storage or de-allocating virtual pages as available for storage;

(d) receiving a data packet by a fourth facility, ascertaining packet size for the received packet, and determining fit by checking allocation state for virtual pages of a smallest size that is equal to or larger than the packet size, then allocation state for next larger virtual pages, and so on, until a de-allocated, available virtual page is found; and (e) selecting a virtual page by a fifth facility, to store the packet, and updating and marking associated atomic pages in the selected virtual page in an ordered manner.

18. The method of claim 17 wherein, in step (b), the second facility maps virtual pages in ascending orders of two from the atomic page size up to the block size.

19. The method of claim 17 wherein the block size is 64 KiloBytes (KB), mapped into 256 atomic pages of 256 Bytes each, and further mapped into 256 virtual pages of 256 bytes each, 128 virtual pages of 512 bytes each, and ascending in powers of two to two virtual pages of 32 KB each, and one virtual page of 64 KB.

20. The method of claim 17 further comprising a mechanism for enabling groups of virtual pages by size, wherein the fifth facility selects only among enabled groups of virtual pages.

21. The system of claim 20 wherein the fifth facility selects a de-allocated virtual page for storing the packet only from the enabled virtual page group of the smallest size that is still equal to or larger than the packet size.

22. The system of claim 20 further comprising a second block of memory of the same fixed block size as the first block of memory, mapped in the same way as the first block of memory, wherein a block is selected for storage based on state of enabled virtual page groups in each block, and then a virtual page is selected in the selected block based on fit.

23. The system of claim 22 wherein enabled groups of virtual pages are mapped as enabled in an ascending order from a first block to a last block, having the effect of reserving lower-order blocks for smaller packet size.

* * * * *

UNITED STATES PATENT AND TRADEMARK OFFICE
CERTIFICATE OF CORRECTION

PATENT NO. : 7,076,630 B2 Page 1 of 1
APPLICATION NO. : 09/881934
DATED : July 11, 2006
INVENTOR(S) : Musoll et al.

It is certified that error appears in the above-identified patent and that said Letters Patent is hereby corrected as shown below:

Item [74]
Page 1, Attorney, Agent, or Firm entry should read:

Donald R. Boys
Richard K. Huffman
James W. Huffman

Item [73]
Page 1, Assignee Name and Residence should read:

MIPS Technologies, Inc.      Mountain View, CA

Signed and Sealed this

Twenty-first Day of November, 2006

JON W. DUDAS
*Director of the United States Patent and Trademark Office*